United States Patent Office 3,647,684
Patented Mar. 7, 1972

3,647,684
ADDING CATIONIC MATERIAL TO SILICIC ACID SORBENT CHROMATOGRAPHIC SHEET FOR IMPROVED PERFORMANCE
Earl W. Malcolm, Bloomfield, Conn., assignor to The Dexter Corporation, Windsor Locks, Conn.
No Drawing. Filed Apr. 17, 1968, Ser. No. 721,951
Int. Cl. B01d 15/08; D21h 5/18
U.S. Cl. 210—31
12 Claims

ABSTRACT OF THE DISCLOSURE

A chromatographic medium exhibiting the high resolution of thin layer chromatography but substantially greater chromatographic capacity takes the form of a self-supporting, flexible sheet structure comprising a major proportion, or about 50% to 90% by weight, of a chromatographic adsorbent, such as silicic acid, uniformly and homogeneously dispersed with a minor proportion of structurally stabilizing inorganic fibers such as glass fibers disposed in a randomly oriented network and about 0.01% to about 1.5% by weight of a cationic material such as cationic starch.

BACKGROUND OF THE INVENTION

The present invention relates to thin layer chromatography and in particular is directed to a new and improved chromatographic medium for separating mixtures of related materials into their individual components.

As is well known, chromatography is based on the principle that different substances within a mixture can be separated from one another and concentrated into zones by passing the mixture through a two phase system. One phase of the system acts as a carrier for the mixture while the other phase exerts a differential restraining force on the components of the mixture to cause separation and stratification thereof. In thin layer chromatography, which is best suited for the separation of closely related complex substances, the carrier is generally a liquid which acts as a solvent for the mixture while the differential restraining phase of the system is a solid adsorbent in the form of a thin, substantially uniform film, layer or sheet along which the mixture is carried by the solvent. As is known, thin layer chromatographic techniques were developed to overcome and circumvent some of the drawbacks and disadvantages associated with earlier chromatographic techniques, such as column and paper chromatography, while retaining and utilizing the advantageous features thereof. Thus, thin layer chromatography combines an ability to separate very small samples of materials in a relatively short period of time with the ability to provide distinct and reproducible separation and resolution of the components. These characteristics are particularly useful in the field of biochemistry where the mixtures are extremely complex and the samples to be separated are exceedingly small.

The thin layer chromatographic media utilized heretofore generally were formed as thin layers of loose adsorbent powder on a suitable support such as a plate of glass, as thin films of adsorbent powder bonded to a glass plate or as papers impregnated with adsorbent materials. Unfortunately, the loose powder, as well as the adsorbent slurries required in producing the adhered films, require special handling and are not always satisfactorily reproducible due to the difficulties experienced in consistently forming a uniform layer of the adsorbent on the glass plate. Additionally, such media exhibit substantial bulk and weight, are difficult to store and handle, and frequently require activation prior to use. Although impregnated papers such as glass fiber papers impregnated with an adsorbent material, circumvent some of these weight and handling difficulties, the impregnation operation introduces problems of sheet texture and reduces the amount of useful adsorbent material available within the chromatographic medium since such sheets generally contain less than 40% by weight of adsorbent, with an average adsorbent content being about 20% to 30% by weight. Additionally, the preformed sheets typically require submicron diameter fibers throughout their entire extent in order to provide the desired uniformity and texture necessary for acceptable chromatographic performance.

Further, the thin layer chromatographic media, unlike the adsorbent columns used in column chromatography, are suited only to small scale preparative work; that is, they possess a chromatographic capacity in the microgram range and are unable to handle the larger size samples. As can be appreciated, a sample size exceeding the adsorptive capacity of the medium will have poor separation, exhibiting smearing and/or tailing of the separated components. Accordingly, it would be most beneficial to obtain a chromatographic medium capable of operation on an increased scale without substantially sacrificing the high resolution generally achieved with the thin layer chromatographic techniques.

SUMMARY OF THE INVENTION

It is therefore a principal object of the present invention to provide a new and improved chromatographic medium which achieves the desired characteristics set forth above and exhibits many of the advantages of both thin layer chromatography and column chromatography while providing a flexible, self-supporting structure similar to that utilized in paper chromatography.

Another object of the present invention is to provide a new and improved thin layer chomatogaphic medium which obviates the necessity for a preformed base member yet exhibits structural integrity coupled with increased concentration of the adsorbent material to yield improved chromatographic performance and increased chromatographic capacity.

An additional object of the present invention is to provide a new and improved chromatographic medium which contains the adsorbent as a major component thereof, that is, as about 50% to 90% by weight of the medium, the adsorbent being uniformly and homogeneously dispersed throughout the extent of the medium despite the fact that the medium takes the form of a soft, self-supporting and flexible sheet of excellent reproducibility and good chromatographic quality.

Still another object of the present invention is to provide a flexible inorganic chromatographic medium exhibiting uniformity and homogeneity throughout a three-dimensional network and the incorporation of limited amounts of larger diameter fibers coupled with the added strength associated with such fibers without adversely effecting chromatographic performance.

A further object of the present invention is to provide a new and improved process for producing a chromatographic medium of the type described, which process imparts increased chromatographic tolerance to certain impurities encountered during the manufacturing operation and includes pH and temperature conditions which yield optimum chromatographic characteristics and near capacity levels of adsorbent material within a self-supporting structure.

These and related objects, in part obvious and in part pointed out more in detail hereinafter, are achieved by the new and improved thin layer chromatographic medium of the present invention which takes the form of a self-supporting flexible sheet structure and generally includes a major proportion, up to 90% by weight, of a chromatographic sorbent material, such as silicic acid, structurally stabilized and homogeneously intermingled with a minor proportion of water-dispersible fibers. The sheet structure is chromatographically enhanced by both its method of manufacture and by the inclusion of at least 0.01% by weight and generally less than 1% by weight of a cationic material.

The invention accordingly comprises the several steps and the relation of one or more of such steps with respect to each of the others and the article possessing the features, properties, and the relation of elements, which are exemplified in the following detailed disclosure, and the scope of the application of which will be indicated in the claims.

DETAILED DESCRIPTION

Accordingly, the present invention is concerned with a new and improved differential restraining phase or chromatographic medium particularly applicable to thin layer chromotographic techniques. The medium advantageously contains the adsorbent material as a major component thereof while taking the form of a thin, soft, flexible structure of substantially uniform and homogeneous composition capable of being accurately reproduced so as to provide constant and controlled adsorbent characteristics which can be relied upon to give reproducible and accurate results. As mentioned, the chromatographic medium is provided with structural and dimensional integrity by the incorporation of water-dispersible fibers, preferably of an inorganic, chromatographically dormant nature which, in accordance with the present invention, need not be entirely of submicron diameter and therefore lend additional and enhanced processability to the manufacturing operation and added strength to the medium. The new and improved structure is generally produced in sheet form in a manner similar to that disclosed in Bodendorf et al. U.S. Pat. No. 3,253,978 dated May 31, 1966. In other words, the medium is preferably formed on a papermaking machine as continuous, fibrous webs. Although the invention is not limited thereto, the sheets are generally formed as medium to heavy basis weight material, i.e., about 50 to 300 pounds, with continuous lengths of such webs preferably having a basis weight of about 100 to 200 pounds. The term "basis weight" as used herein refers to the weight in pounds of 480 sheets of the medium having planar dimensions of 24" by 36".

Although most adsorbents suitable for use in column or thin layer chromatography can be utilized in the present invention, the material considered most generally useful is silicic acid (hydrated silica). Alumina is also employed to a substantial degree, although less than silicic acid. In general, the adsorbent may include organic or inorganic materials depending upon their adsorption activity and the type of separation required of the medium. For example, powdered ion exchange resins, polyethylene, cellulose and cellulose derivatives such as cellulose acetate may be employed. However, the soft, low melting organic materials are less desirable than the hard refractory inorganic materials such as silicic acid, alumina, calcium, sulphate, charcoal and diatomaceous earth. Accordingly, the latter are generally employed, with silicic acid being the preferred material. Where desired, the adsorbent may be of the fluorescent type. incorporating phosphor which will fluoresce under suitable light conditions such as ultraviolet, except in those areas where the separated components absorb the light and therefore appear black.

The inorganic adsorbent also is preferred because it is frequently necessary to subject a colorless chromatogram to suitable reagents for developing the results of the chromatographic operation and thereby locate the separated materials. Organic materials present in the chromatogram in appreciable amounts, that is, in amounts of about 1.0% or more may mask the location of the separated material and therefore are undesirable. For example, sulfuric acid or other destructive reagents are commonly employed as developers and will attack the organic compounds within the chromatogram, causing the organic material to become visible as black, brown or gray spots on a white background. The use of an organic adsorbent will seriously restrict the use of such a technique. Additionally, differential absorption developing techniques might be required and the presence of organic materials in amounts as low as 0.5% by weight could hamper identification of the separated materials. It will be appreciated, of course, that the deleterious effects of organic materials will vary with the amount and type of material being identified as well as with the identification method being employed.

The particle size of the adsorbent generally influences the rate at which the solvent moves along the film of adsorbent and also influences the quality or resolution of the separation. For best results the average particle size of the adsorbent is closer to the size used in thin layer chromatography than to the larger particle size used in columns. Accordingly, materials having an average particle size of 70 microns and less are preferred. Because particles less than one micron generally exhibit a tendency to develop slowly while larger particles having an average particle size exceeding 40 microns tend to cause deterioration in the resolution of the chromatogram, the preferred average particle size for the adsorbent is about 1 to 10 microns.

Although conventional paper-making fibers can be employed in the manufacture of the chromatographic medium of the present invention, it is generally preferred that the fibrous material also be inorganic in order to permit unlimited development of the chromatogram by materials which might adversely affect cellulosic fibers. Accordingly, the typical inorganic fibers utilized in the present invention include glass, quartz, ceramic, asbestos, mineral wool or suitable combinations thereof. It is generally required that these fibers be capable of being dispersed in an aqueous medium to form the necessary fiber slurry or furnish suitable for use on conventional papermaking machines. This is particularly true in order to take advantage of the benefits derived from the method set forth herein for making the chromatographic medium of the present invention. Thus, the fibers as used are generally of paper-making length, that is, normally greater than $\frac{1}{100}$ inch in length and ranging to even more than 2 inches in length with a length to width ratio in excess of 500:1 and preferably closed to 1000:1 or more. As can be appreciated, the fiber length employed will depend to a large degree upon the ability of the fibers to form the dilute aqueous slurry or fiber furnish required for sheet forming operations. It is, of course, desirable for the fibers within the furnish to be maintained in a substantially uniform state of disposition prior to deposition on the sheet forming wire so as to provide the most randomly oriented fiber network possible.

In accordance with the present invention the fibers may vary substantially in thickness, although it is generally preferred that inorganic fibers having diameters substantially less than 10 microns and preferably less than 5 microns predominate the fiber content of the chromatographic media. In fact, fibers having an average diameter of about 0.05 to 4.0 microns generally constitute more than half the fiber content and preferably about 75% or more of the fibers within the sheet structure. Advantageously, some coarser fibers are also employed in minor amounts in accordance with the present invention to provide enhanced processability during continuous operation and a desirable reinforcing or strengthening effect within the sheet both during and after processing. These may include glass rovings having a diameter of about 9.0 microns and a length of about ½ inch or conventional cellulosic fibers of about 20 microns diameter, if chromatographically permissible. Such coarser fibers may constitute as much as 5% by weight of the chromatographic sheet material when the fiber content is entirely inorganic and as much as 10% by weight if cellulosic fibers are utilized.

As mentioned hereinbefore, the adsorbent-fiber sheet structure is chromatographically enhanced by using a chromatographically permissible amount of an organic cationic material. In this regard, the cationic material is generally maintained at less than 0.5% by weight, concentration levels higher than 1.5% being undesirable because of the problems encountered with certain developing reagents and systems, as mentioned hereinbefore. Additionally, the cationic material should not interfere with subsequent extraction steps conventionally employed. Accordingly, the cationic material is used in amounts ranging from about 0.05% to 0.50% with a range of 0.1% to 0.3% exhibiting consistently good results.

Although most cationic materials utilized will provide improved chromatographic performance to limited degrees, it has been found that cationic starches produce by far the best results and have proven to be consistently satisfactory in commercial operation. Surprisingly, the improved chromatographic performance is achieved despite the fact that extremely low percentages of cationic material are utilized and these concentrations evidence little or no improved effect on the tensile strength or retention of adsorbent within the resultant sheet structure. In fact, many of the cationic materials at the concentration levels of the present invention cause a reduction in the tensile strength of the sheet structure while still providing an improvement in chromatographic performance. Accordingly, a typical chromatographic medium will have the following compositions:

| Materials: | Percent by weight |
| --- | --- |
| Silicic acid | 75.0 |
| Glass fibers: | |
|   0.5 micron diameter | 14.75 |
|   2.0 micron diameter | 8.0 |
|   9.0 micron diameter | 2.0 |
| Organic cationic agent | 0.25 |

As mentioned, the cationic starches generally exhibit the most beneficial results and consequently are the preferred organic additives. Such starches, typically used at concentrations of 0.25% by weight are generally amine modified starches which are considered to be starch ethers using an amino or imino group to provide a positive charge. The starches may be derived from conventional sources such as corn, wheat, potato, tapioca, waxy maize, sago or rice. Exemplary of such materials are the amine modified starches sold under the trade name "Cato" by National Starch and Chemical Corporation of Plainfield, N.J.

The process of the present invention utilized to manufacture the improved chromatographic medium broadly involves the admixture in water of the adsorbent material and fibers to form a dilute, substantially homogeneous, aqueous dispersion or slurry. The thorough mixing of the components can be effected by adding a dispersion of the silicic acid to the fibers suspended in water within a suitable mixing device such as a paper mill beater. A solution or dispersion of the organic cationic material is then added to the adsorbent-fiber dispersion and the pH and temperature of the resultant admixture is appropriately adjusted prior to formation of the sheet structure on a paper-making wire, such as a conventional Fourdrinier wire.

The sheet material is made in accordance with conventional paper-making techniques and is a nonwoven web structure wherein the integrity of the sheet is maintained primarily by the physical interengagement of the individual fibers as deposited on the web-forming wire of the papermaking machine. As is well known, the solids or dispersions of solids are admixed and thoroughly dispersed in an aqueous medium by means of a paper mill beater. The resultant mixture with its pH and temperature adjusted is then conveyed to the head box of a paper-making machine where it is further diluted and fed onto the continuous fiber accumulating, paper-forming wire, such as a Fourdrinier wire. It will be appreciated that the cationic material may be added to the fiber dispersion at the mixing stage or after the fiber slurry has been fed to the head box and as part of the diluting operation. Although substantially all commercial paper-making machines, including the regular Fourdrinier or rotary cylinder machines, may be used, it is desirable where very dilute fiber furnishes are employed to use an inclined fiber collecting wire, such as that described in U.S. Pat. No. 2,045,095 issued to F. H. Osborne on June 23, 1936. The fibers flowing from the head box are retained on the wire in a random three-dimensional reticulate network or configuration with slight orientation in the machine direction, while the dispersing aqueous phase quickly passes through the wire and is rapidly and effectively removed.

It has been unexpectedly found in accordance with the present invention that optimum chromatographic performance is obtained when the fiber furnish containing the cationic starch is maintained at an acid pH and a slightly elevated temperature, e.g., a pH of about 3 and temperature of about 120° F. This is particularly surprising since sheet materials produced without the cationic material show no substantial effect as a result of temperature change and heretofore the pH of the furnish was believed to have no noticeable effect on chromatographic performance. The temperature utilized in accordance with the present invention may be broadly categorized as "warm" since the fiber furnish or slurry need only be at a temperature of from about 20° F. to 70° F. above room temperature, i.e., within the range of about 90° F. to 140° F. For consistently acceptable results operating temperatures within the range of 95° F. to 130° F. are conventionally employed with a typical operating temperature in excess of 140° F. are patricularly undesirable at low pH levels as the hot acid solutions more readily attack the solids within the furnish under such conditions.

As mentioned hereinbefore the pH of the fiber slurry should be maintained at a low or acid value, i.e., in the range of about 2.5 through 4.5 in order to provide optimum chromatographic performance. This adjustment can be effectuated prior to but preferably at the head box of the paper-making machine by adding controlled amounts of acid through a conventional metering system. Mineral acids are particularly well suited for this purpose with hydrochloric acid giving commercially acceptable results. Since alum (potassium aluminum sulphate) is frequently present in conventional paper-making operations and unfortunately is extremely detrimental to the chromatographic performance of inorganic adsorbent-fiber sheet materials, it is particularly advantageous that the acid pH conditions of the process of the present invention tend to control the adverse effect of minor quantities of alum, that is, less than 1% by weight. Therefor, the operating conditions of the process are particularly desirable since they increase the chromatographic tolerance of the sheet material to minor amounts of such adverse materials, especially those materials which are likely to be present during the sheet forming operation. Additionally, the resultant sheet structures produced under these conditions are substantially neutral, exhibiting a post-formation pH of about 6.5.

As will be appreciated, increased compaction of the sheet structure will tend to decrease the speed of the carrier phase as it moves along the adsorbent medium and will accordingly provide more distinct separation of the materials within the mixture being treated. Although such wet pressing is not necessary in order to provide the improved chromatographic performance of the present invention, it will provide enhancement of the chromatographic characteristics of the resultant sheet material by reducing any irregularities and effecting more intimate contact between the adsorbent particles within the medium. Accordingly, some wet pressing of the sheet material immediately upon formation may be desirable even though the pressure applied to the wet web is very slight.

As indicated, the chromatographic media of the present invention are particularly advantageous in that they can be utilized in accordance with standard thin layer chromatographic techniques, yet will provide a chromatographic capacity which is 4 to 5 times greater than the thin layer chromatographic media utilized heretofore. Accordingly, the medium to heavy basis weight materials of the present invention are capable of rapidly and efficiently separating mixtures of closely related materials in milligram quantities, rather than microgram quantities, with a degree of resolution heretofore considered possible only with thin layer chromatographic media. Thus, there is achieved high resolving power coupled with an increased scale of operation and the added dimension of flexibility as provided by a self-supporting fibrous web containing up to about 90% by weight of a chromatographically adsorbent material.

The following specific examples are given in order that the effectiveness of the present invention may be more fully understood. These examples are set forth for the purpose of illustration only and are not intended in any way to limit the practice of this invention. Unless otherwise specified all parts are given by weight.

EXAMPLE ONE

A fiber slurry was made by initially dispersing about 90 grams of glass fiber having an average diameter of 0.2–0.5 micron (Code 104 microglass), 40 grams of glass fiber having an average diameter of 0.5–0.75 micron (Code 106 microglass) and 15 grams of glass fiber having an average diameter of 1.6–2.6 microns (Code 110 microglass) in about 18 liters of water adjusted to a pH of 3.0 with HCl. To this dispersion was added 10 grams of ½" long glass rovings having an average diameter of about 9 microns and 400 grams of fluorescent silicic acid (SilicAR TLC-4F). The resultant slurry was mixed for about 15 minutes in a standard laboratory Valley beater after which a portion thereof was added to a sheet mold and adjusted to a temperature of 120° F. and a pH of 3. To this portion was then added a 1% aqueous solution of cationic starch (Cato 15) in an amount sufficient to produce a starch concentration of 0.25% by weight based on the dry weight of the solids in the slurry. A hand sheet was formed, dried between blotters at a light pressure of approximately 10 p.s.i. and then dried on a laboratory drum dryer at approximately 230° F. The hand sheet exhibited a tensile strength of approximately 700 gm./in.

The chromatographic performance of the sheet was evaluated by visual observation of the developed chromatogram after using the following procedure. The sheets were conditioned in a circulating air oven for fifteen minutes at 70° C. Samples of the standard three component Stahl dye mixture in both microliter amounts and in amounts approximately five times the maximum recommended amount for thin layer chromatograms were applied to a starting line on the sheet and the sheet developed by standard chromatogrgaphic ascending procedures using benzene as the developing liquid. The solvent front was allowed to advance 10 centimeters from the starting line at which point the material was removed from the developing tank and allowed to air dry. The sharpness and length of the yellow component of the Stahl dye mixture was then examined together with the degree of separation or resolution of the chromatogram. Hand sheets produced as set forth above showed excellent separation of the three dyes present in both test samples of the Stahl dye mixture.

EXAMPLE TWO

The procedure outlined in Example One was followed except the silicic acid was replaced by an equal amount by weight of aluminum oxide, and the concentration of cationic starch in the slurry was 0.3% instead of 0.25%. Since the chromatographic aluminum oxide employed does not adequately separate the yellow component of the Stahl dye mixture, the red component was used as a measure of chromatographic performance. After running the chromatogram it was found that adequate separation occurred between the blue and red components with uniform spot size in both test samples.

EXAMPLE THREE

Using a standard laboratory beater with 18 liters of water at 100° F. and a pH of 3, a slurry of glass fibers was prepared from 51 grams of Code 104 microglass, 12 grams of Code 106 microglass and 6 grams of Code 110 microglass. The fibers added to the beater were defibered and lightly brushed to clear the glass fibers after which 6 grams of ½" rovings and 300 grams of fluorescent silicic acid (SilicAR TLC-4F) were added and defibered to give a uniform suspension. Sufficient cationic starch was added to give a starch concentration of 0.05% by weight and the material in the beater was then used to make hand sheets having a basis weight of 175 pounds per 2880 sq. ft. Sheet mold conditions were maintained at a temperature of 100° F. and a pH of 3. After formation and removal from the wire, the wet sheet was dried without wet pressing. Chromatographic evaluation was made in accordance with the procedure set forth in Example One and separation of the components in the Stahl dye mixture was judged acceptable but minimum.

Sheets made in the same manner except that the sheet mold conditions included a temperature of 70° F. and a pH of 7 gave spot sizes ranging from 150% to 200% longer indicating poor and unacceptable chromatographic performance.

EXAMPLE FOUR

Sheet material was produced on an experimental, sloped wire, Fourdrinier paper-making machine. About 250 gallons of water were supplied to the beater with the pH adjusted to 3 with HCl and a temperature adjusted to the 80° F.–90° F. range. To the beater was added 23 pounds of Code 104 microglass, 10 pounds of Code 106 microglass and 4 pounds of Code 10 microglass. The microglass was then given a light brush to clear the glass fibers. Next, 3 pounds of ½" glass rovings were added together with 100 pounds of fluorescent silicic acid (SilicAR TLC-4F). The beater furnish was then defibered for 20 minutes to thoroughly admix the components and 5 gallons of a 0.1 lb./gal. cationic starch solution (Cato 15) was then added to the beater. The suspension after mixing for 5 minutes was then pumped to the machine chest with the addition of sufficient water to yield a 3% consistency in the tank.

The water in the headbox was adjusted to a pH of 3 with HCl and held at a temperature of approximately 120° F. Normal procedures were followed to form the wet fibrous web. After formation and water removal, the material was removed from the Fourdrinier wire and passed through a nip (approximately 10 p.l.i. nip pressure) and dried on the standard drying drums. Machine speed was approximately 25 feet per minute and the basis weight of the finished product was approximately 90 lbs./ 2880 sq. ft. Chromatographic evaluation of the material showed the material to have satisfactory chromatographic performance. The material had an MD tensile of approximately 300 g. and a CD tensile of approximately 200 g. The density of the product was approximately 0.36 g./cc., and the porosity was approximately 1.7 c.f.m. as measured on the Frazier porosity instrument. The material possessed adequate strength to be handled and processed in the normal paper converting operations.

EXAMPLE FIVE

Using the pilot equipment and the procedure similar to that outlined in Example Four, a furnish was made containing 70 pounds of Code 104 microglass, 20 pounds of Code 106 microglass, 10 pounds of Code 110 microglass, 6 pounds of ½" glass rovings and 150 pounds of silicic acid. Cationic starch (Cato 15) solution was added to the tank to give a starch concentration of 0.25% by weight based on the total solids. A sheet was produced under the same conditions as in the preceding example, except for the pH which was maintained at approximately 5 to 6. The dry sheet had an average MD tensile of 700 grams and a CD tensile of 180 grams. The density of the sheet was about 0.33 gm./cc. with a porosity of approximately 1.3 c.f.m./sq. ft. (Frazier). The basis weight of the material was approximately 115 pounds. Chromatographic separation of the Stahl dye mixture was deemed adequate.

As will be apparent to persons skilled in the art, various modifications and adaptations of the process and product above-described will become readily apparent without departure from the spirit and scope of the invention, the scope of which is defined in the appended claims.

I claim:

1. In a flexible, self-supporting sheet structure free of organic binders and suited for thin layer chromatographic applications comprised essentially of chromatographic sorbent material and water-dispersible fibrous material wherein the weight proportion of sorbent material is greater than that of the fibrous material, the improvement comprising the inclusion of a cationic material in an amount sufficient to impart improved chromatographic performance and improved chromatographic capacity to the sheet structure, said amount being at least 0.01% by weight and less than the amount necessary relative to the sorbent and fibrous materials within the structure to effect substantially improved tensile strength and retention of the sorbent material within the sheet structure, said sorbent, fibrous and cationic materials being substantially uniformly and homogeneously dispersed throughout said sheet structure.

2. The sheet structure of claim 1 wherein the sorbent material is silicic acid and at least 75% of the fibrous material consists of glass fibers, the proportion of silicic acid to fibrous material being within the range of 3:2 to 4:1, and the cationic material being cationic starch comprising 0.1% to 0.3% by weight of the sheet structure.

3. The sheet structure of claim 1 wherein the sorbent material is inorganic and comprises 50% to 90% by weight of the sheet structure.

4. The sheet structure of claim 1 wherein the cationic material comprises 0.05% to 0.50% by weight of the sheet structure.

5. The sheet structure of claim 1 wherein the cationic material is organic.

6. The sheet structure of claim 1 wherein the fibrous material includes up to 5% by weight of inorganic fibers having an average fiber diameter of about 9.0 microns.

7. The sheet structure of claim 6 wherein the fibrous material is comprised predominantly of inorganic fibers having an average fiber diameter of 0.05 to 4.0 microns.

8. A process for chromatographically resolving a mixture comprising the steps of forming a chromatogram of the mixture on a sheet structure free of organic binders and comprised of chromatographic sorbent, water-dispersible fibers and a cationic agent, the weight proportion of sorbent being greater than that of fibers, the cationic material being present in the sheet structure in an amount sufficient to impart improved chromatographic performance and improved chromatographic capacity to the sheet structure, said amount being at least 0.01% by weight, said sorbent, fiber and cationic agents being substantially uniformly and homogeneously dispersed throughout said sheet structure; and thereafter developing the resulting chromatogram.

9. The process of claim 8 wherein the sorbent is silicic acid and at least 75% of the fibers consists of glass fibers, the proportion of silicic acid to fibers being within the range of 3:2 to 4:1, and the cationic material being cationic starch comprising 0.1% to 0.3% by weight of the sheet structure.

10. The method of claim 8 wherein the fiber to sorbent weight ratio is about 1:3 and the cationic material is cationic starch at a concentration of 0.05% to 0.5% by weight.

11. The method of claim 8 wherein the fiber includes up to 5% by weight of inorganic fibers having an average fiber diameter of about 9.0 microns, the cationic material is organic and the sheet structure has a medium to heavy basis weight.

12. The method of claim 8 wherein the sorbent is inorganic and comprises 50% to 90% by weight of the sheet structure.

References Cited

UNITED STATES PATENTS

| | | | |
|---|---|---|---|
| 3,253,978 | 5/1966 | Bodendorf et al. | 162—152 |
| 3,224,927 | 12/1965 | Brown et al. | 162—181 X |
| 3,455,818 | 7/1969 | Leifield | 210—31 |
| 3,549,486 | 12/1970 | Pitt | 162—206 X |

S. LEON BASHORE, Primary Examiner

R. H. TUSHIN, Assistant Examiner

U.S. Cl. X.R.

162—149, 156, 175, 181 C; 210—502